United States Patent [19]
Yoshida et al.

[11] Patent Number: 5,711,158
[45] Date of Patent: Jan. 27, 1998

[54] APPARATUS AND METHOD FOR CHARGING THREE-COMPONENT MIXED REFRIGERANT

[75] Inventors: Yuji Yoshida, Itami; Masami Funakura, Neyagawa; Mitsuharu Matsuo; Minoru Tagashira, both of Hirakata, all of Japan

[73] Assignee: Matsushita Electric Industrial Co., Ltd., Osaka, Japan

[21] Appl. No.: 638,784

[22] Filed: Apr. 29, 1996

[30] Foreign Application Priority Data

May 15, 1995 [JP] Japan .................. 7-115504

[51] Int. Cl.$^6$ ............................ F25B 45/00
[52] U.S. Cl. .................... 62/77; 62/114; 62/292; 62/502
[58] Field of Search .............. 62/77, 149, 114, 62/292, 502; 252/67

[56] References Cited

U.S. PATENT DOCUMENTS

| | | |
|---|---|---|
| 4,688,388 | 8/1987 | Lower et al. ............ 62/292 |
| 4,978,467 | 12/1990 | Shankland et al. . |
| 5,095,713 | 3/1992 | Laukhuf et al. ............ 62/77 |
| 5,211,867 | 5/1993 | Shankland et al. . |
| 5,370,811 | 12/1994 | Yoshida et al. . |

FOREIGN PATENT DOCUMENTS

| | | |
|---|---|---|
| 6-914B2 | 1/1994 | Japan . |
| 6-281272A | 10/1994 | Japan . |

*Primary Examiner*—John M. Sollecito
*Attorney, Agent, or Firm*—Watson Cole Stevens Davis, P.L.L.C.

[57] ABSTRACT

The present invention provides an apparatus for charging a three-component mixed refrigerant substitutable for R22 or R502 and a method for charging the three-component mixed refrigerant. A high-boiling point refrigerant container and a metering device for the high-boiling point refrigerant and a container for an azeotrope-like mixed refrigerant lower in boiling point than said high-boiling point refrigerant and a metering device for the azeotrope-like mixed refrigerant are connected to one pipe line having a refrigerant charging port, and a given amount of the high-boiling point refrigerant and a given amount of the lower boiling point azeotrope-like mixed refrigerant are metered and charged in this order in a heat pump apparatus.

8 Claims, 3 Drawing Sheets

APPARATUS AND METHOD FOR CHARGING THREE-COMPONENT MIXED REFRIGERANT

BACKGROUND OF THE INVENTION

1. Field of the Invention

The present invention relates to an apparatus for charging three-component mixed refrigerants which are usable in place of R22 or R502 and to a method for packing the three-component mixed refrigerants.

2. Description of Prior Art

Prior art heat pump apparatuses for air-conditioners, refrigerators and freezers comprise a compressor, a condenser, a throttling device such as a capillary tube and an expansion valve, and an evaporator, which are connected through piping and performs the cooling action by circulating a working fluid therethrough. In these heat pump apparatuses, halogenated hydrocarbons derived from methane or ethane which are called chloro-fluorohydrocarbons such as R22 and R502 are generally used as working fluids. Among them, R22 (chlorodifluoromethane; boiling point: $-40.8°$ C.) is widely used as a working fluid for air-conditioners and freezers, and R502 (azeotropic mixed refrigerant composed of chlorodifluoromethane R22 and chloropentafluoroethane R115; boiling point: $-45.3°$ C.) is used as a working fluid for freezers and refrigerators. Since the azeotropic mixed refrigerants have nearly the same composition in both vapor phase and liquid phase, R502 is handled as if it is a single refrigerant.

Recently, however, destruction of the ozone layer in the stratosphere by chloro-fluorohydrocarbons becomes a global environmental problem, and since chloro-fluorohydrocarbons has an ability to destroy ozone in the stratosphere, usage and production of chloro-fluorohydrocarbons were already regulated by the Montreal Protocol, and there is a movement to ban the use and production of chloro-fluorohydrocarbons in the future. In order for no substantial influence to be exerted on the ozone layer in the stratosphere, it is necessary that no chlorine is contained in the molecular structure of fluorinated hydrocarbons, and the fluorinated hydrocarbons containing no chlorine have been proposed. The fluorinated hydrocarbons containing no chlorine include, for example, difluoromethane ($CH_2F_2$, R32; boiling point: $-52°$ C.), pentafluoroethane ($CF_3$—$CHF_2$, R125; boiling point: $-48°$ C.), 1,1,1-trifluoroethane ($CF_3$—$CH_3$, R143a; boiling point: $-48°$ C.), 1,1,1,2-tetrafluoroethane ($CF_3$—$CH_2F$, R134a; boiling point: $-27°$ C.), and 1,1-difluoroethane ($CHF_2$—$CH_3$, R152a; boiling point: $-25°$ C.). R32, R125 and R143a have a lower boiling point than that of R22, and have a very high condensation pressure in the heat pump apparatuses. Therefore, they each is difficult to be used by itself as a substitute for R22. R134a and R152a have a higher boiling point than that of R22 to reduce the refrigerating capacity of the heat pump apparatuses. Therefore, they each is also difficult to be used by itself as a substitute for R22. Furthermore, R32, R143a and R152a have a defect as being flammable. Thus, for example, a three-component mixed refrigerant comprising R32/R125/R134a has been proposed as a substitute refrigerant for R22 and a three-component mixed refrigerant comprising R125/R143a/R134a has been proposed as a substitute refrigerant for R502.

However, the above-mentioned three-component mixed refrigerants are all non-azeotropic mixed refrigerants, and their boiling points and dew points differ from each other. Furthermore, the low-boiling-point component is apt to be concentrated in a vapor phase, and the high-boiling-point component is apt to be concentrated in a liquid phase. Thus, care must be taken in charging them into heat pump apparatuses and, in principle, they are charged in the liquid form. Although they are nonflammable in a mixed form, inadvertent charging of an excess beyond the desired of R32 and R143a in a vapor form into the heat pump apparatus would induce a problem in the safety of the apparatus, especially because R32 and R143a in the mixed refrigerant are flammable.

Moreover, there is a production process in which an apparatus applied to R22 and an apparatus applied to R502 are produced at the same time, and since R22 and R502 differ in the boiling point from each other, it is desired to produce them while changing the compositions thereof in the three-component mixed refrigerant and, for this purpose, separate apparatuses for charging the refrigerants are required.

JP-B-6-914 (U.S. Pat. No. 4,978,467) discloses that combination of difluoromethane (R32) and pentafluoroethane (R125) forms an azeotrope-like mixed refrigerant, and U.S. Pat. No. 5,211,867 and JP-A-6-281272 discloses that combination of pentafluoroethane (R125) and 1,1,1-trifluoroethane (R143a) forms an azeotrope-like mixed refrigerant.

SUMMARY OF THE INVENTION

The object of the present invention is to provide an apparatus and method for charging a three-component refrigerant in heat pump apparatuses.

In accordance with the present invention, a given amount of a high-boiling-point refrigerant is charged, and then a given amount of an azeotrope-like mixed refrigerant having a lower boiling point than that of the high-boiling-point refrigerant is charged. These refrigerants are charged in this order with carrying out metering of these refrigerants through a pipeline having a refrigerant-charging port to which a container for the high-boiling-point refrigerant and a metering device therefor, and a container for the azeotrope-like mixed refrigerant and a metering device therefor are connected.

R134a is used as the high-boiling-point refrigerant and an R32/R125 mixed refrigerant containing 60 wt % or less of R32 or an R125/R143a mixed refrigerant containing 60 wt % or less of R143a is used as the lower-boiling-point azeotrope-like mixed refrigerant.

DETAILED DESCRIPTION OF PREFERRED EMBODIMENTS

In the present invention, the azeotrope-like mixed refrigerant which is charged from the azeotrope-like mixed refrigerant container after the high-boiling-point refrigerant metered from the high-boiling-point refrigerant container was charged has nearly the same level of boiling point and dew point and nearly the same composition in both a vapor phase and liquid phase and hence can be handled as if it is a single refrigerant. Regardless of charging in a liquid form or vapor form, the flammable component is not charged in the heat pump apparatus in a larger amount than that of the desired composition. Furthermore, the present invention makes it possible to adjust the refrigerating capacity by charging the azeotrope-like mixed refrigerant and the high-boiling-point refrigerant at an optionally-set charging ratio.

According to the present invention, 1,1,1-tetrafluoroethane (R134a) is used as the high-boiling-point refrigerant, and as the lower-boiling-point azeotrope-like mixed refrigerant is used a difluoromethane (R32)/pentafluoroethane (R125) mixed refrigerant or a R125/trifluoroethane (R143a) mixed refrigerant, which contains 60 wt % or less of R32 or R143a, both flammable. The combination of R32/R125 or R125/R143a forms the azeotrope-like mixed refrigerant and the flammable R32 or R143a is not charged in the heat pump apparatus in a larger amount than that of the desired and, in addition, a metered amount of the R32/R125 mixed refrigerant or R125/R143a mixed refrigerant, which has a lower boiling point than that of R22, can be mixed with a metered amount of the R134a, which has a higher boiling point than that of R22, at an optionally-set ratio in a specified compositional range. Therefore, the present invention makes it possible for only one charging apparatus to produce both the substitutive refrigerant having a vapor pressure similar to that of R22 suitable for air-conditioners and refrigerators and the substitutive refrigerant having a vapor pressure similar to that of R502 suitable for freezers and refrigerators.

Figure 1:
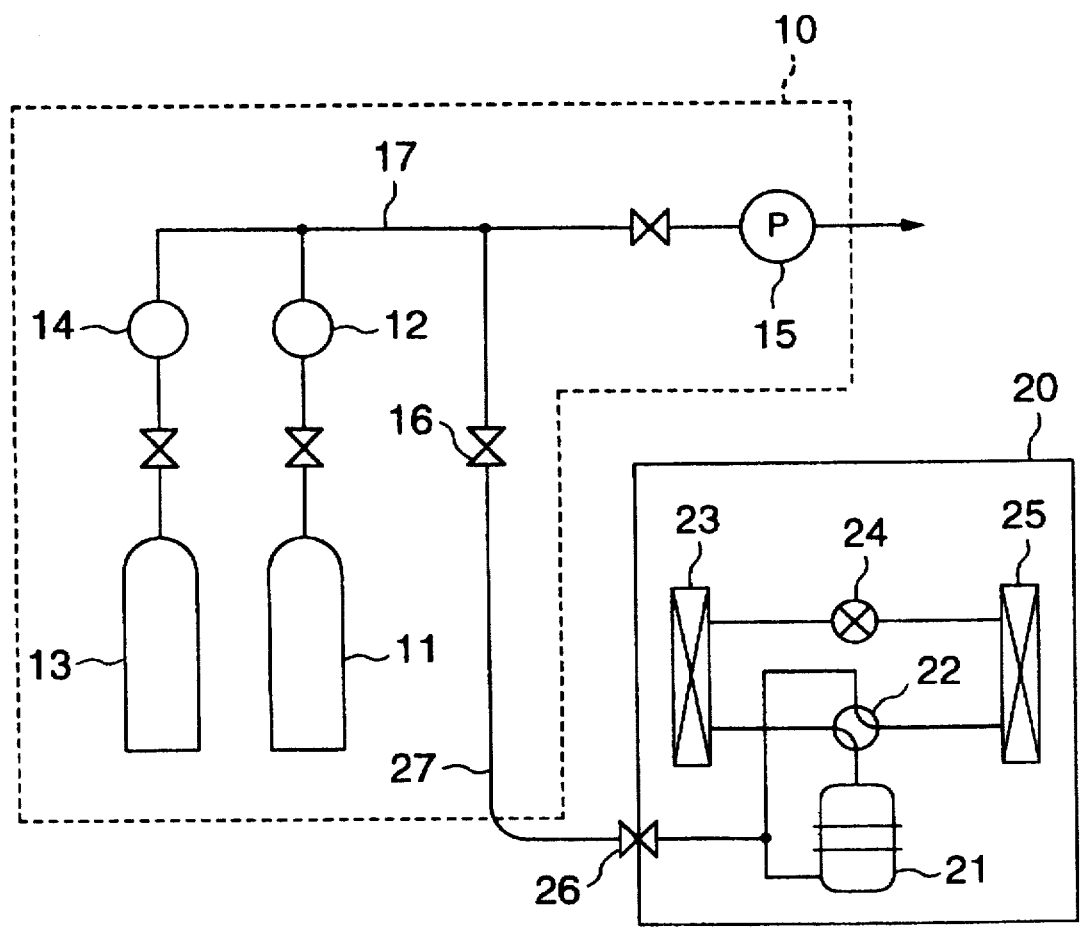
FIG. 1 is a schematic view of an apparatus for charging a three-component mixed refrigerant in accordance with the present invention.

The apparatus for charging a three-component mixed refrigerant and the method according to the present invention will be illustrated with reference to the examples shown in FIG. 1. In FIG. 1, 10 indicates a refrigerant-charging apparatus of the present invention, 11 indicates a high-boiling-point refrigerant container, 12 indicates a metering device for the high-boiling-point refrigerant, 13 indicates an azeotrope-like mixed refrigerant container and 14 indicates a metering device for the azeotrope-like mixed refrigerant, and an azeotrope-like mixed refrigerant comprising two components having a lower boiling point than that of the refrigerant in the high-boiling-point refrigerant container 11 is contained in the azeotrope-like mixed refrigerant container 13. These devices, device 15 for drawing a vacuum and on-off valves are connected to a pipeline 17 having refrigerant charging port 16.

In the heat pump apparatus 20, compressor 21, four-way valve 22, condenser 23, throttling device 24 such as capillary tube or expansion valve and evaporator 25 are connected through piping, and an oil such as an ester oil fitted for the fluorinated hydrocarbons containing no chlorine is contained in the compressor 21. The four-way valve 22 is not necessary for equipments which carry out only the cooling action, such as freezers and refrigerators. The three-component mixed refrigerant is charged in the heat pump apparatus 20 in the following manner. That is, with metering a given amount of the high-boiling-point refrigerant and a given amount of the lower-boiling-point azeotrope-like mixed refrigerant in this order from the high-boiling-point refrigerant container 11 and the azeotrope-like mixed refrigerant container 13, they are charged in the heat pump apparatus 20 in which a vacuum is drawn by the device 15 from the refrigerant pouring port 26 provided on a low pressure line, for example, between evaporator 25 of the heat pump apparatus 20 and compressor 21 (sucking port) through the pipe 27 connecting the refrigerant charging port 16 of the refrigerant charging apparatus 10. In this case, the high-boiling-point refrigerant is first charged and dissolves in the oil in the compressor 21. Therefore, the lower-boiling-point azeotrope-like mixed refrigerant can be charged without causing much increase of the pressure in the heat pump apparatus, and when the azeotrope-like mixed refrigerant is charged while the heat pump apparatus 20 is operated, the pressure in the low pressure line of the heat pump apparatus 20 decreases and the refrigerant can be more easily charged.

Therefore, the azeotrope-like mixed refrigerant charged from the azeotrope-like mixed refrigerant container 13 after the high-boiling-point refrigerant metered from the high-boiling-point refrigerant container 11 was charged has nearly the same level of boiling point and dew point and nearly the same composition in both vapor phase and liquid phase. Therefore, it can be handled as if it is a single refrigerant. For example, even if a flammable component is contained in the azeotrope-like mixed refrigerant, the flammable component is not charged in the heat pump apparatus 20 in a larger amount than that of the desired, irrespective of charging in a liquid or vapor form, which will make it possible to charge the desired three-component composition in a suitable amount.

In the example of FIG. 1, explanation is made on the three-component mixed refrigerant charging apparatus 10 in which the high-boiling-point refrigerant container 11, the high-boiling-point refrigerant metering device 12, the azeotrope-like mixed refrigerant container 13, the azeotrope-like mixed refrigerant metering device 14, the vacuum-drawing device 15, and the refrigerant charging port 16 are connected to one pipeline 17. It is a matter of course that the connection of the piping 27 to the refrigerant pouring port 26 can be changed at the site of installation of the heat pump apparatus 20 in order of the vacuum forming operation by the vacuum-drawing device 15, the high-boiling-point refrigerant metering and charging operation from the high-boiling-point refrigerant container 11 and the azeotrope-like mixed refrigerant metering and charging operation from the azeotrope-like mixed refrigerant container 13.

Example of the three-component mixed refrigerant prepared using the refrigerant charging apparatus and the charging method of the present invention is explained using the diagram of vapor pressure.

Figure 2:
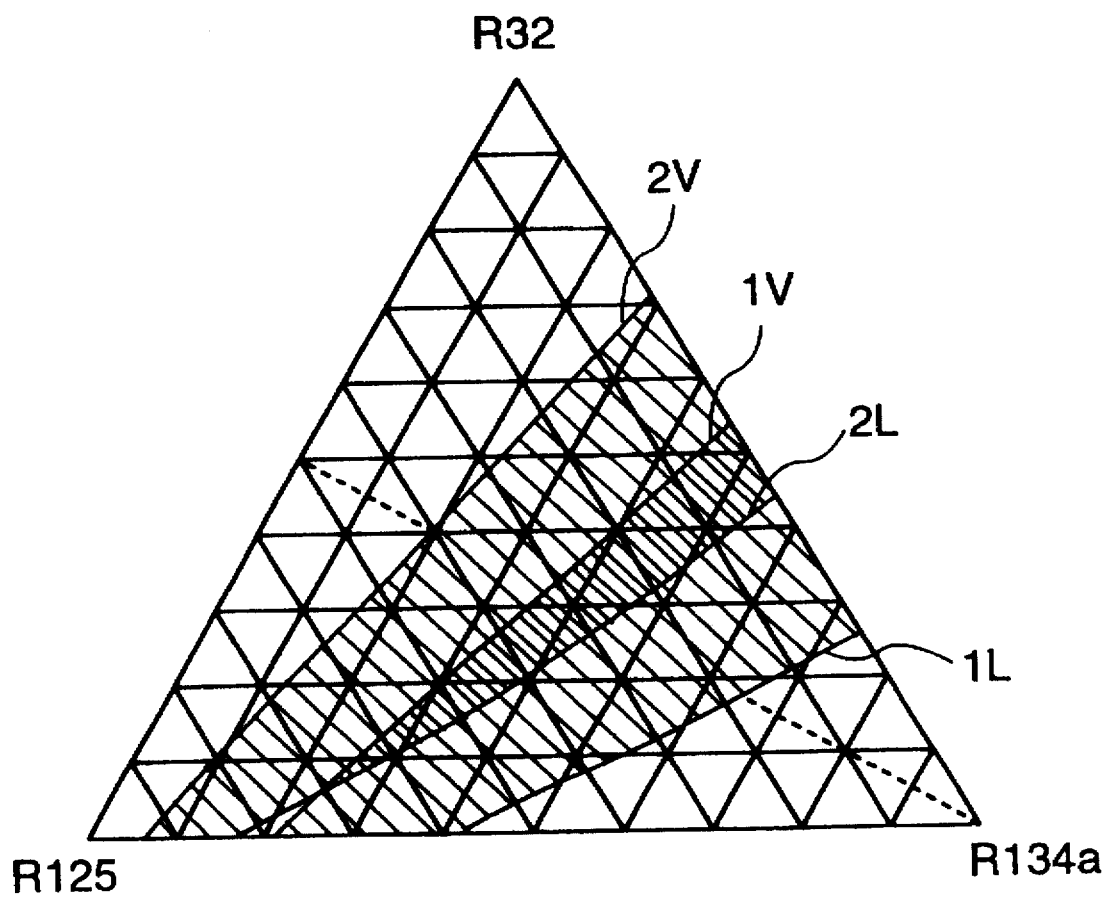
FIG. 2 is a triangular coordinate illustrating an equilibrium state of a working fluid composed of three components of R134a and R32/R125 mixed refrigerant at a constant temperature and a constant pressure.

FIG. 2 is a triangular coordinate showing the equilibrium of a working fluid comprising the three components: difluoromethane ($CH_2F_2$, R32; b.p.: $-52°$ C.), pentafluoroethane ($CF_3$—$CHF_2$, R125; b.p.: $-48°$ C.), and 1,1,1,2-tetrafluoroethane ($CF_3$—$CH_2F$, R134a; b.p.: $-27°$ C.) at a constant temperature and a constant pressure.

In this triangular coordinate, the respective single substances (single components) are arranged at the apexes of the triangle counterclockwise in order of the boiling point (from the lower to higher boiling point) with the the top apex being a starting point, and the compositional ratio by weight of the components at a certain point on the coordinate plane is represented by the ratio of distances between the point and each opposite side of the triangle. In this case, the distance between the point and the side of the triangle corresponds to the compositional proportion of the substance given at the apex opposite to the side.

In FIG. 2, 1V and 1L are vapor-liquid equilibrium lines of the mixture at a temperature of $-40.8°$ C. and under a pressure of 0.1013 MPa, and this temperature and this pressure correspond to the saturated state at the normal boiling point of R22. The line 1V of the vapor-liquid equilibrium lines (corresponding to the normal boiling point of R22) represents saturated vapor phase line and the line 1L of the vapor-liquid equilibrium lines (corresponding to the normal boiling point of R22) represents saturated liquid phase line and the mixture in the area between these lines is at the vapor-liquid equilibrium state, and the line connecting the point on the saturated vapor phase line 1V and the point on the saturated liquid phase line 1L is called a tie line, and a point on the saturated vapor phase line 1V represents the equilibrating saturated vapor phase composition and a point on the saturated liquid phase line 1L represents the equilibrating saturated liquid phase composition. The 2V and 2L are vapor-liquid equilibrium lines of the mixture at a temperature of −45.3° C. and under a pressure of 0.1013 MPa, and this temperature and this pressure correspond to the saturated state at the normal boiling point of R502.

The composition on the saturated vapor phase line 1V vaporizes under a pressure higher than the atmospheric pressure and liquefies under the atmospheric pressure at the normal boiling point temperature of R22. The composition on the saturated liquid phase line 1L vaporizes under the atmospheric pressure and liquefies under a pressure lower than the atmospheric pressure at the normal boiling point temperature of R22. The composition in the area between these two lines vaporizes under a pressure higher than the atmospheric pressure and liquefies under a pressure lower than the atmospheric pressure at the normal boiling point temperature of R22. Conversely speaking, as for the composition in the area between the vapor-liquid equilibrium lines 1V and 1L corresponding to the normal boiling point temperature of R22, under the atmospheric pressure the vapor phase condenses at a temperature higher than the normal boiling point temperature of R22 and changes to liquid phase at a temperature lower than the normal boiling point temperature of R22, and under the atmospheric pressure the liquid phase evaporates at a temperature lower than the normal boiling point temperature of R22 and changes to vapor phase at a temperature higher than the normal boiling point temperature of R22. That is, under the atmospheric pressure, the composition in the area between the vapor-liquid equilibrium lines 1V and 1L has a low boiling point and a high dew point between which the normal boiling point of R22 is interposed, and, thus, it becomes possible to obtain condensation temperature and evaporation temperature nearly the same as those of R22. Therefore, the composition is suitable as a refrigerant substitutable for R22 in air-conditioners, refrigerators and so on. Similarly, under the atmospheric pressure, the composition in the area between the vapor-liquid equilibrium lines 2V and 2L has a low boiling point and a high dew point between which the normal boiling point of R502 is interposed, and, thus, it becomes possible to obtain condensation temperature and evaporation temperature nearly the same as those of R502. Therefore, the composition is suitable as a refrigerant substitutable for R502 in air-conditioners, refrigerators and the like.

As can be seen from FIG. 2, in the case of the three-component mixed refrigerant comprising R32/R125/R134a, the composition in the area between the vapor-liquid equilibrium lines 1V and 1L corresponding to the normal boiling point of R22 and the composition in the area between the vapor-liquid equilibrium lines 2V and 2L corresponding to the normal boiling point of R502 partially overlap, but the area suitable as a substitute for R502 shifts to the area of the lower boiling point component being contained in a large amount than the area suitable as a substitute for R22.

Furthermore, as can be seen from the phase equilibrium diagram of FIG. 2, when the three-component mixed refrigerant comprising R32/R125/R134a is charged in a three-component mixed form, if the charging is carried out in vapor state, the flammable R32 is charged in an amount larger than desired and this may bring about a problem in the safety of apparatus.

On the other hand, each tie line nearly coincides with the line which connects R134a and a point on the side connecting R32 and R125. This shows that the R32/R125 mixed refrigerant is an azeotrope-like mixed refrigerant and the flammable R32 is distributed at a given composition in the vapor phase and the liquid phase. Therefore, when the R32/R125 mixed refrigerant is charged after R134a, the flammable R32 is never charged in an amount larger than desired even when the vapor charging are carried out.

For example, when the R32/R125 mixed refrigerant of 50% by weight/50% by weight which is an azeotrope-like mixed refrigerant is mixed with R134a, this is shown on the broken line in FIG. 2. In this case, the compositional ranges of R32/R125 mixed refrigerant and R134a being about 35% by weight—about 65% by weight and about 65% by weight—about 35% by weight, respectively, namely, the compositional ranges of R32, R125 and R134a being about 17.5% by weight—about 32.5% by weight, about 17.5% by weight—about 32.5% by weight, and about 35% by weight—about 65% by weight, respectively, provide nearly the same vapor pressure as of R22 and these are preferred, and the compositional ranges of R32/R125 mixed refrigerant and R134a being about 55% by weight—about 80% by weight and about 45% by weight—about 20% by weight, respectively, namely, the compositional ranges of R32, R125 and R134a being about 27.5% by weight—about 40% by weight, about 27.5% by weight—about 40% by weight, and about 20% by weight—about 45% by weight, respectively, provide nearly the same vapor pressure as of R502 and these are preferred.

On the other hand, in R32/R125 mixed refrigerant which is an azeotrope-like mixed refrigerant, the flammable R32 is preferably 60% by weight or less, and the three-component mixed refrigerant which is formed by mixing R32/R125 with R134a can secure nearly the nonflammability even if any charging methods are employed.

Table 1 shows ideal refrigerating performance of the three-component refrigerant comprising R32/R125 mixed refrigerant of 50% by weight/50% by weight and R134a. The conditions therefor are a condensation average temperature of 50° C., an evaporation average temperature of 0° C. and a subcooling degree of 0 deg at the outlet of condenser and a superheating degree of 0 deg at the outlet of evaporator. The condensation pressure of R22 at this time is 1.948 MPa, the evaporation pressure is 0.498 MPa and the discharging temperature is 74.44° C., and the condensation pressure of R502 at this time is 2.094 MPa, the evaporation pressure is 0.568 MPa and the discharging temperature is 59.53° C. The ideal refrigerating performance of R502 is lower than that of R22, but since the discharging temperature of R502 can be lowered than that of R22, R502 is utilized for equipments such as refrigerators, freezers and others.

As can be seen from Table 1, the three-component system comprising 50% by weight of R134a and 50% by weight of R32/R125 (50% by weight/50% by weight) which is the compositional range for giving the same vapor pressure as R22, namely, the three-component system comprising 25% by weight of R32, 25% by weight of R125 and 50% by weight of R134a has nearly the same properties as R22.

Furthermore, with increasing the charging proportion of R32/R125 mixed refrigerant of 50% by weight/50% by weight, the condensation pressure and the evaporation pressure increase, and the three-component system comprising 60% by weight of R32/R125 (50% by weight/50% by weight) and 40% by weight of R134a which is a range for giving the same vapor pressure as that of R502, namely, the three-component system comprising 30% by weight of R32, 30% by weight of R125 and 40% by weight of R134a is almost superior to R502 in both the refrigerating capacity and the coefficient of performance apart from the discharging temperature.

In the example of Table 1, R32/R125 mixed refrigerant of 50% by weight/50% by weight is mixed with R134a, but when R32/R125 mixed refrigerant of 60% by weight/40% by weight is mixed with R134a, further improved properties can be expected, and adjustment of refrigerating capacity becomes possible by setting the charging ratio of the azeotrope-like mixed refrigerant and the high-boiling-point refrigerant at an optional ratio.

TABLE 1

| Refrigerant | (R32/R125 (50/50) )/R134a | | | | |
| --- | --- | --- | --- | --- | --- |
| Compositional ratio (wt %) | 0/100 | 50/50 | 60/40 | 70/30 | 100/0 |
| Refrigerating capacity (as compared with R22) | 0.609 | 0.999 | 1.077 | 1.155 | 1.387 |
| Coefficient of performance (as compared with R22) | 0.982 | 0.960 | 0.947 | 0.933 | 0.892 |
| Refrigerating ability (as compared with R502) | 0.650 | 1.066 | 1.149 | 1.232 | 1.481 |
| Coefficient of performance (as compared with R502) | 1.084 | 1.059 | 1.045 | 1.030 | 0.984 |
| Condensation pressure (MPa) | 1.321 | 1.968 | 2.307 | 2.488 | 3.038 |
| Evaporation pressure (MPa) | 0.292 | 0.459 | 0.559 | 0.613 | 0.797 |
| Discharging temperature (°C.) | 55.52 | 66.31 | 69.74 | 71.11 | 73.47 |
| Glide compensation temperature (deg) | 0.00 | 4.84 | 4.25 | 3.50 | 0.16 |
| Glide of evaporation temperature (deg) | 0.00 | 4.14 | 4.05 | 3.50 | 0.06 |

Figure 3:
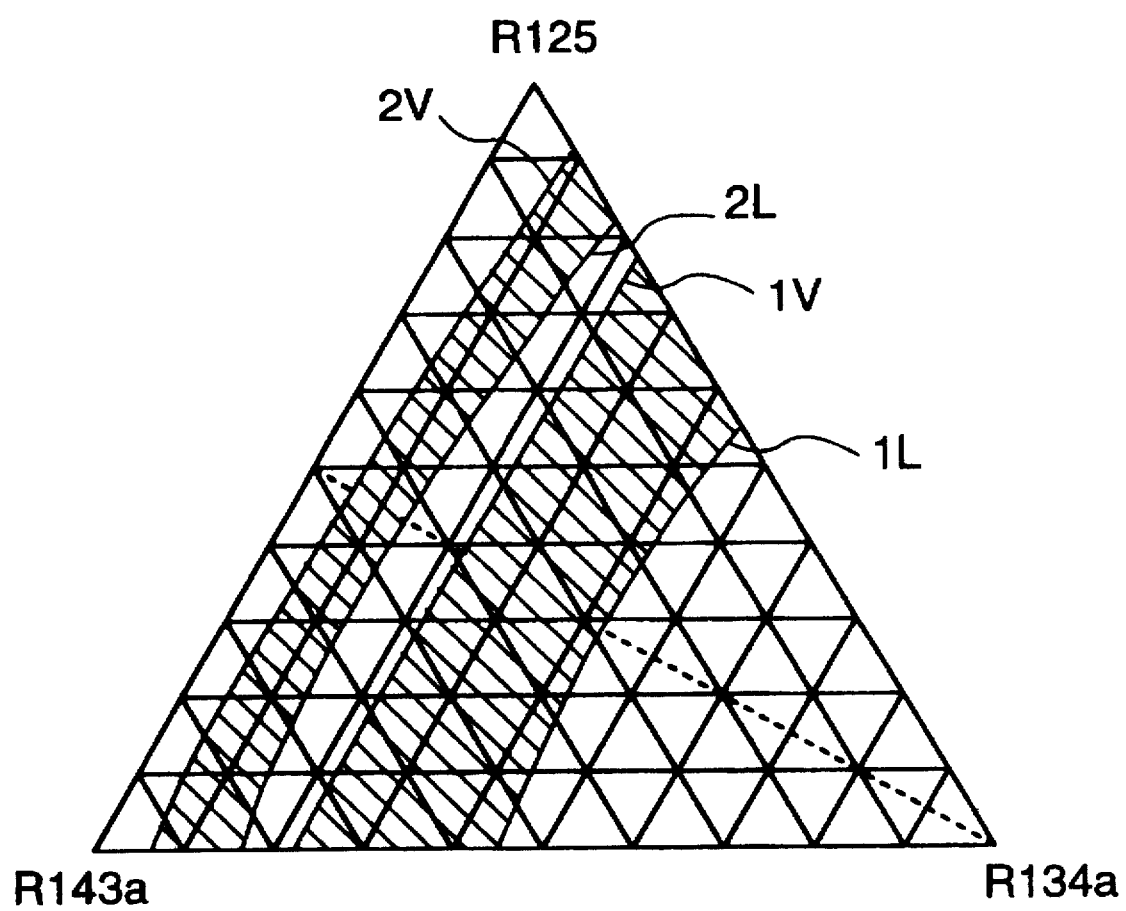
FIG. 3 is a triangular coordinate illustrating an equilibrium state of a working fluid composed of three components of R134a and R125/R143a mixed refrigerant at a constant temperature and a constant pressure.

Next, FIG. 3 is a triangular coordinate which shows the equilibrium state of a working fluid comprising a mixture of the three components of pentafluoroethane ($CF_3$—$CHF_2$, R125; b.p.: −48° C.), 1,1,1-trifluoroethane ($CF_3$—$CH_3$, R143a; b.p.: −48° C.) and 1,1,1,2-tetrafluoroethane ($CF_3$—$CH_2F$, R134a, b.p.: −27° C.) at a constant temperature and a constant pressure.

In FIG. 3, lines 1V and 1L are vapor-liquid equilibrium lines of the mixture at a temperature of −40.8° C. and under a pressure of 0.1013 MPa, and the temperature and pressure correspond to the saturated state at the normal boiling point of R22. The line 1V of the vapor-liquid equilibrium lines (corresponding to the normal boiling point of R22) represents a saturated vapor phase line and the line 1L of the vapor-liquid equilibrium lines (corresponding to the normal boiling point of R22) represents a saturated liquid phase line and the mixture in the area between these lines is at the vapor-liquid equilibrium state, and the lines connecting the point on the saturated vapor phase line 1V and the point on the saturated liquid phase line 1L are called tie lines, and a point on the saturated vapor phase line 1V represents the equilibrating saturated vapor phase composition and a point on the saturated liquid phase line 1L represents the equilibrating saturated liquid phase composition. The lines 2V and 2L are vapor-liquid equilibrium lines of the mixture at a temperature of −45.3° C. and under a pressure of 0.1013 MPa, and the temperature and pressure correspond to the saturated state at the normal boiling point of R502.

Under the atmospheric pressure, the composition in the area between the vapor-liquid equilibrium lines 1V and 1L has a low boiling point and a high dew point between which the normal boiling point of R22 is interposed, and, thus, it becomes possible to obtain a condensation temperature and evaporation temperature nearly the same as those of R22. Therefore, the composition is suitable as a refrigerant substitutable for R22 in air-conditioners, refrigerators and so on. Similarly, under the atmospheric pressure, the composition in the area between the vapor-liquid equilibrium lines 2V and 2L has a low boiling point and a high dew point between which the normal boiling point of R502 is interposed, and, thus, it becomes possible to obtain a condensation temperature and evaporation temperature nearly the same as those of R502. Therefore, the composition is suitable as a refrigerant substitutable for R502 in air-conditioners, refrigerators and the like.

As can be seen from FIG. 3, in the case of the three-component mixed refrigerant comprising R125/R143a/R134a, the composition in the area between the vapor-liquid equilibrium lines 1V and 1L corresponding to the normal boiling point of R22 and the composition in the area between the vapor-liquid equilibrium lines 2V and 2L corresponding to the normal boiling point of R502 do not overlap, and the area suitable as a substitute for R502 shifts to the area of the low boiling point component being contained in a large amount from the area suitable as a substitute for R22.

Furthermore, as can be seen from the phase equilibrium diagram of FIG. 3, when the three-component mixed refrigerant comprising R125/R143a/R134a is charged in a three-component mixed form, if the charging is carried out in a vapor state, the flammable R143a is charged in an amount larger than desired and there may be brought about a problem in the safety of apparatus.

On the other hand, each tie line nearly coincides with the line which connects R134a and a point on the side connecting R125 and R143a. This shows that the R125/R143a mixed refrigerant is an azeotrope-like mixed refrigerant and the flammable R143a is distributed at a given composition in the vapor phase and the liquid phase. Therefore, when the R125/R143a mixed refrigerant is charged after R134a, the flammable R143a is never charged in an amount larger than desired even when the vapor charging are carried out.

For example, when the R125/R143a mixed refrigerant of 50% by weight/50% by weight which is an azeotrope-like mixed refrigerant is mixed with R134a, this is shown on the broken line in FIG. 3. In this case, the compositional ranges of R125/R143a mixed refrigerant and R134a being about 58% by weight—about 78% by weight and about 42% by weight—about 22% by weight, respectively, namely, the compositional ranges of R125, R143a and R134a being about 29% by weight—about 39% by weight, about 29% by weight—about 39% by weight and about 22% by weight—about 42% by weight, respectively, give nearly the same vapor pressure as that of R22 and these are preferred, and the compositional ranges of the R125/R143a mixed refrigerant and the R134a being about 86% by weight—about 94% by weight and about 14% by weight—about 6% by weight, respectively, namely, the compositional ranges of R125, R143a and R134a being about 43% by weight—about 47% by weight, about 43% by weight—about 47% by weight, and about 6% by weight—about 14% by weight, respectively, give nearly the same vapor pressure as that of R502 and these are preferred.

On the other hand, in the R125/R143a mixed refrigerant which is an azeotrope-like mixed refrigerant, the flammable R143a is preferably 60% by weight or less, and the three-component mixed refrigerant which is formed by mixing R125/R143a with R134a can secure nearly the nonflammability even if any charging methods are employed.

Table 2 shows the ideal refrigerating performance of the three-component system comprising the R125/R143a mixed refrigerant of 50% by weight/50% by weight and the R134a. The conditions therefor are a condensation average temperature of 40° C., an evaporation average temperature of −35° C., a subcooling degree of 0 deg at the outlet of condenser and a superheating degree of 65 deg at the outlet of evaporator. In this case, the enthalpy of superheating at the outlet of the evaporator is not included in the refrigerating capacity. The condensation pressure of R22 at this time is 1.538 MPa, the evaporation pressure is 0.132 MPa and the discharging temperature is 156.02° C., and the condensation pressure of R502 at this time is 1.669 MPa, the evaporation pressure is 0.160 MPa and the discharging temperature is 121.00° C. The ideal refrigerating performance of R502 is lower than that of R22, but since the discharging temperature of R502 can be lowered than that of R22, R502 is utilized for equipments such as refrigerators, freezers and others, and when R 22 is used, there is an example of using a liquid injection refrigerating circuit (not shown in the drawing) by which liquid refrigerant of condenser outlet is injected into a compressor in order to lower the discharging temperature.

As can be seen from Table 2, the three-component system comprising 30% by weight of R134a and 70% by weight of the R125/R143a (50% by weight/50% by weight) which is the compositional range for giving the same vapor pressure as R22, namely, the three-component system comprising 35% by weight of R125, 35% by weight of R143a and 30% by weight of R134a shows a refrigerating performance lower than R22, but the discharging temperature can be greatly lowered and there is the merit of omitting the liquid injection refrigerating circuit.

Furthermore, with increasing the charging proportion of the R125/R143a mixed refrigerant of 50% by weight/50% by weight, the condensation pressure and the evaporation pressure increase, and the three-component system comprising 90% by weight of the R125/R143a (50% by weight/50% by weight) and 10% by weight of R134a which is a range for giving the same vapor pressure as that of R502, namely, the three-component system comprising 45% by weight of R125, 45% by weight of R143a and 10% by weight of R134a is lower than R502 in the discharging temperature and has almost the same refrigerating capacity as R502.

In the example of Table 2, the R125/R143a mixed refrigerant of 50% by weight/50% by weight is mixed with R134a, but when R125/R143a mixed refrigerant of 40% by weight/60% by weight is mixed with R134a, further improved properties can be expected, and adjustment of refrigerating capacity becomes possible by setting the charging ratio of the azeotrope-like mixed refrigerant and the high-boiling point refrigerant at an optional ratio.

TABLE 2

| Refrigerant | (R125/R143a (50/50) )/R134a | | | | |
|---|---|---|---|---|---|
| Compositional ratio (wt %) | 0/100 | 60/40 | 70/30 | 90/10 | 100/0 |
| Refrigerating capacity (as compared with R22) | 0.507 | 0.0733 | 0.778 | 0.873 | 0.921 |
| Coefficient of performance (as compared with R22) | 0.956 | 0.862 | 0.841 | 0.803 | 0.782 |
| Refrigerating ability (as compared with R502) | 0.535 | 0.773 | 0.820 | 0.920 | 0.972 |
| Coefficient of performance (as compared with R502) | 1.098 | 0.991 | 0.966 | 0.922 | 0.898 |
| Condensation pressure (MPa) | 1.018 | 1.483 | 1.571 | 1.762 | 1.863 |
| Evaporation pressure (MPa) | 0.066 | 0.115 | 0.128 | 0.157 | 0.175 |
| Discharging temperature (°C.) | 120.29 | 117.21 | 116.35 | 113.38 | 111.39 |
| Glide compensation temperature (deg) | 0.00 | 2.44 | 2.05 | 0.82 | 0.04 |
| Glide of evaporation temperature (deg) | 0.00 | 2.50 | 2.28 | 1.04 | 0.00 |

In the above example, explanation is given of the case where R134a is used as a high-boiling-point refrigerant and R32/R125 mixed refrigerant or R143a/R125 mixed refrigerant is used as a lower-boiling-point azeotrope-like mixed refrigerant, but combination of these three components is not necessarily limitative. For example, R152a or isobutane may be used in place of R134a as a high-boiling-point refrigerant or a three-component mixed refrigerant comprising isobutane as a high-boiling point refrigerant and propane/R134a mixed refrigerant as a lower boiling point azeotrope-like mixed refrigerant may be used.

As is clear from the above explanation, according to the present invention, a container for a high-boiling-point refrigerant and a metering device for the high-boiling-point refrigerant and a container for an azeotrope-like mixed refrigerant lower in boiling point than said high-boiling-point refrigerant and a metering device for the azeotrope-like mixed refrigerant are connected to one pipe line having a refrigerant charging port, and a given amount of the high-boiling-point refrigerant and a given amount of the lower-boiling-point azeotrope-like mixed refrigerant are metered in this order and charged in a heat pump apparatus. Therefore, the azeotrope-like mixed refrigerant which is charged from the azeotrope-like mixed refrigerant container after the high-boiling-point refrigerant was metered and charged from the high-boiling-point refrigerant container has nearly the same boiling point and dew point and, furthermore, is nearly the same composition in its vapor phase and liquid phase and, thus, the mixed refrigerant can be handled as if it is a single-component refrigerant and no flammable component is charged in an amount larger than desired in the heat pump apparatus regardless of charging in a liquid state or vapor state. Moreover, by setting the charging ratio of the azeotrope-like mixed refrigerant and the high-boiling-point refrigerant at an optional ratio, it becomes possible to adjust the refrigerating capacity.

Furthermore, according to the present invention, by using R134a as a high-boiling-point refrigerant and an R32/R125 mixed refrigerant containing 60 wt % or less of R32 or an R125/R143a mixed refrigerant containing 60 wt % or less of R143a as an azeotrope-like mixed refrigerant having a lower boiling point than that of said high-boiling-point refrigerant, difluoromethane (R32) and pentafluoroethane (R125) or pentafluoroethane (R125) and 1,1,1-trifluoroethane (R143a) constitute an azeotrope-like mixed refrigerant, respectively, and the flammable R32 or R143a is not charged in a larger amount than that of the desired in the heat pump apparatus, and, in addition, since the R32/R125 mixed refrigerant or R125/R143a mixed refrigerant which is lower than R22 in boiling point and R134a which is higher than R22 in boiling point can be mixed at an optional ratio in a specified compositional range with metering them, it becomes possible to produce, by using one charging apparatus, both the substitute refrigerant having a vapor pressure similar to that of R22 suitable for air-conditioners, refrigerators, etc. and the substitute refrigerant having a vapor pressure similar to that of R502 suitable for freezers, refrigerators, etc.

What is claimed is:

1. An apparatus for charging a three-component mixed refrigerant comprising a pipeline, a refrigerant charging port formed at the pipe line, and a container for a high-boiling-point refrigerant and a container for an azeotrope-like mixed refrigerant lower in boiling point than said high-boiling point refrigerant which are connected to the pipeline through metering devices, a given amount of the high-boiling point refrigerant and a given amount of the azeotrope-like mixed refrigerant being charged in a heat pump apparatus with being metered in this order.

2. An apparatus according to claim 1, wherein R134a is used as the high-boiling-point refrigerant and R32/R125 mixed refrigerant containing 60 wt % or less of R32 or R125/R143a mixed refrigerant containing 60 wt % or less of R143a is used as the azeotrope-like mixed refrigerant.

3. An apparatus according to claim 1, wherein R134a is used as the high-boiling-point refrigerant and R32/R125 mixed refrigerant containing 60 wt % or less of R32 is used as the azeotrope-like mixed refrigerant.

4. An apparatus according to claim 1, wherein R134a is used as the high-boiling-point refrigerant and R125/R143a mixed refrigerant containing 60 wt % or less of R143a is used as the azeotrope-like mixed refrigerant.

5. A method for charging a three-component mixed refrigerant which comprises charging a given amount of a high-boiling-point refrigerant in a heat pump apparatus through a pipeline and then charging a given amount of an azeotrope-like mixed refrigerant lower in boiling point than the high-boiling-point refrigerant in the heat pump apparatus through the pipeline.

6. A method according to claim 5, wherein R134a is used as the high-boiling-point refrigerant and R32/R125 mixed refrigerant containing 60 wt % or less of R32 or R125/R143a mixed refrigerant containing 60 wt % or less of R143a is used as the azeotrope-like mixed refrigerant.

7. A method according to claim 5, wherein R134a is used as the high-boiling-point refrigerant and R32/R125 mixed refrigerant containing 60 wt % or less of R32 is used as the azeotrope-like mixed refrigerant.

8. A method according to claim 5, wherein R134a is used as the high-boiling-point refrigerant and R125/R143a mixed refrigerant containing 60 wt % or less of R143a is used as the azeotrope-like mixed refrigerant.

* * * * *